United States Patent [19]

Fox

[11] Patent Number: 5,379,869

[45] Date of Patent: Jan. 10, 1995

[54] BRAKING DISCS

[75] Inventor: Michael Fox, Heswall, England

[73] Assignee: Sab Wabco Holdings BV, Heerhugowaard, Netherlands

[21] Appl. No.: 70,526

[22] Filed: Jun. 3, 1993

[30] Foreign Application Priority Data

Jun. 4, 1992 [GB] United Kingdom ............... 9211865

[51] Int. Cl.6 ............................................. F16D 65/10
[52] U.S. Cl. ................... 188/218 XL; 188/73.2; 188/264 A
[58] Field of Search ............... 188/18 A, 58, 59, 71.4, 188/73.2, 218 A, 218 R, 218 XL, 264 A, 264 R; 192/107 R, 107 T, 107 C; 301/6.1, 6.5, 6.8

[56] References Cited

U.S. PATENT DOCUMENTS

| 4,280,598 | 7/1981 | Pöllinger | 188/218 XL |
| 5,010,985 | 4/1991 | Dussell et al. | 188/218 XL |
| 5,101,940 | 4/1992 | Mungo et al. | 188/218 XL |
| 5,137,122 | 8/1992 | Watson | 188/218 XL |
| 5,150,774 | 9/1992 | Adamson | 188/218 XL |
| 5,158,511 | 10/1992 | Mungo | 188/218 XL |

Primary Examiner—Robert J. Oberleitner
Assistant Examiner—Chris Schwartz
Attorney, Agent, or Firm—Oblon, Spivak, McClelland, Maier & Neustadt

[57] ABSTRACT

The present specification describes a braking disc comprising a hub member and an annular braking disc member, the hub member being attachable to a wheel and having at least two outwardly extending spokes. The free end region of each spoke is engageable between two lugs provided on a face of the annular braking disc member, the opposite face of the annular braking disc member forming the braking area of the disc. The two lugs have facing profiled surfaces which extend generally radially of the annular braking disc member, part of a spoke engaging the profiled surface of one lug to be retained thereby while part of an intermediate member engages the profiled surface of the other lug to thus be retained thereby. A spring is located between the spoke and said intermediate member to press the spoke and the intermediate member against the respective profiled surfaces and to thus retain the spoke between the lugs, while allowing for radial movement between the spokes and the annular braking disc member.

15 Claims, 5 Drawing Sheets

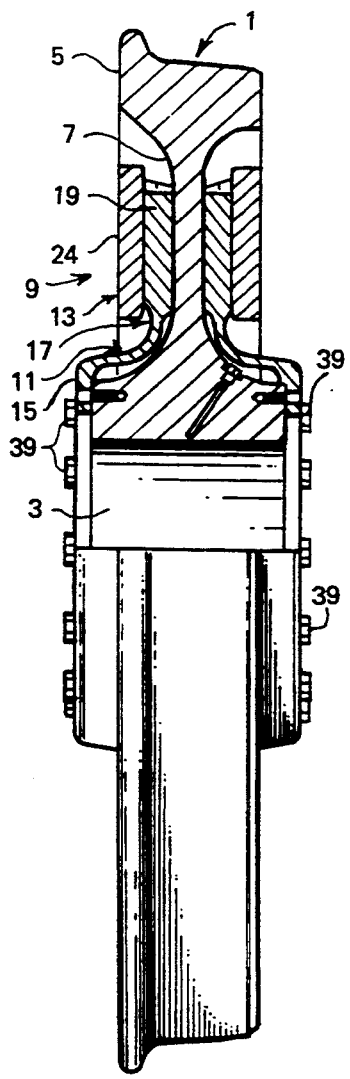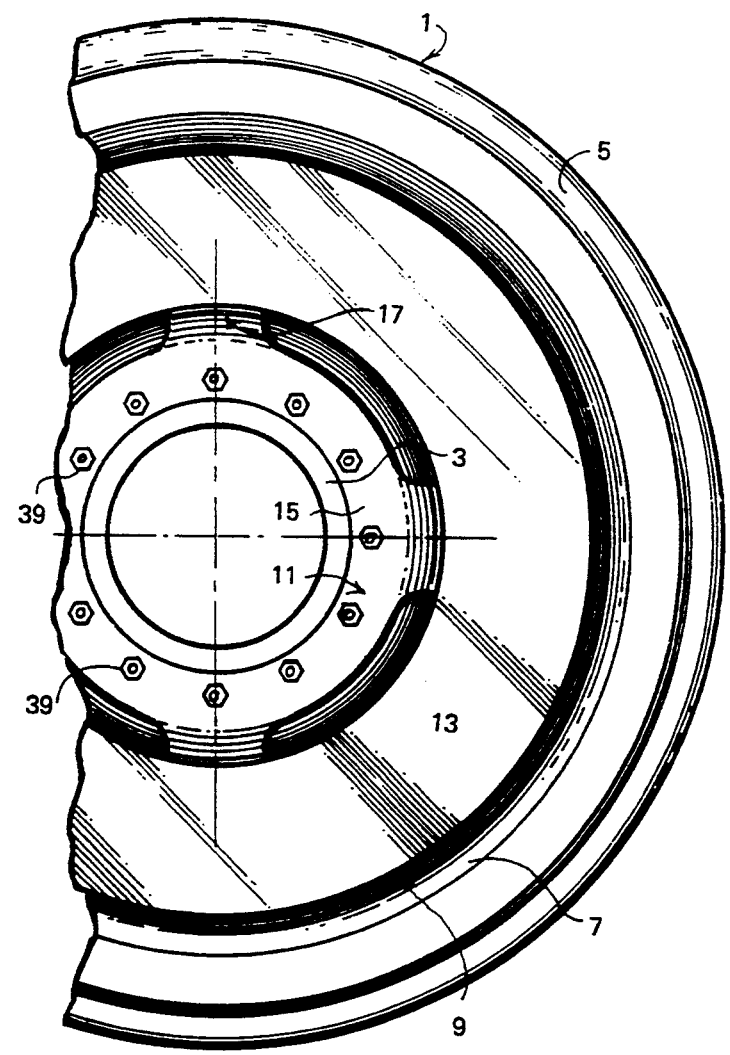
FIG. 1  FIG. 2

FIG. 4
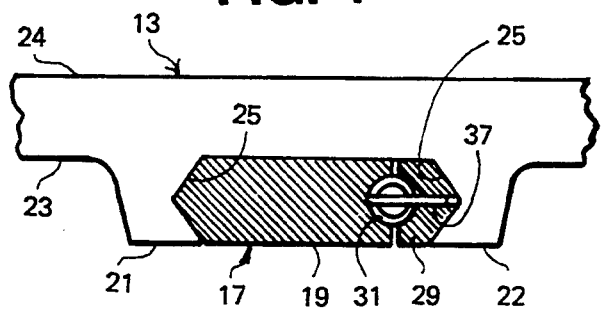
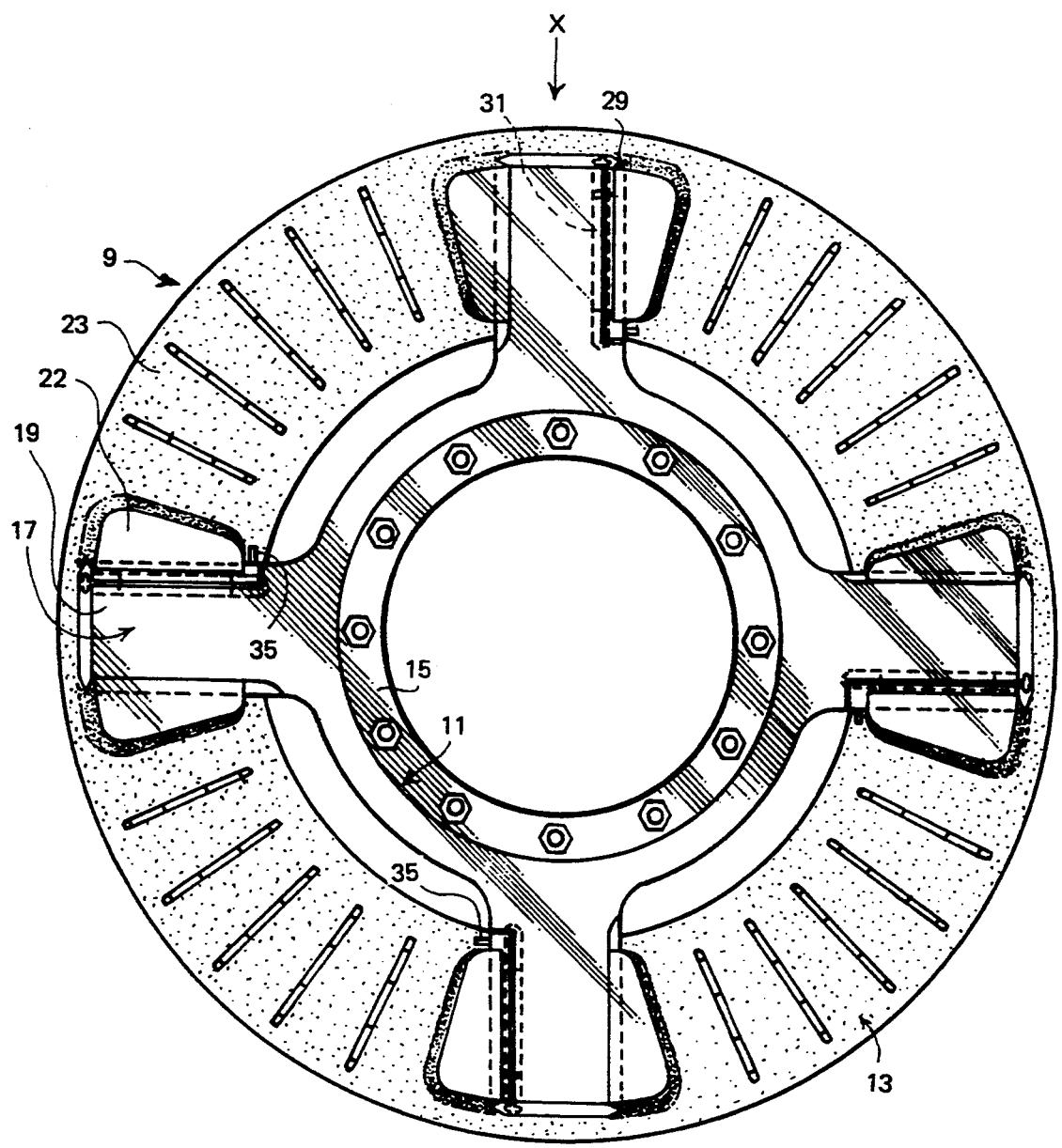
FIG. 3

BRAKING DISCS

The present invention relates to a braking disc for mounting on a wheel of a vehicle.

In particular the present invention relates to a braking disc which is adapted to be mounted on a wheel hub, the braking disc being constructed to cater for thermal expansion with there being no holes formed in the braking surface of the braking disc so that the braking area is maximised and the possibility of thermal stress cracks as can occur around apertures in a braking surface, is avoided.

According to the present invention there is provided a braking disc comprising a hub member and an annular braking disc member, the hub member being attachable to a wheel and having at least two outwardly extending spokes, the free end region of each spoke being engageable between two lugs provided on a face of the annular braking disc member, the opposite face of the annular braking disc member forming the braking area of the disc, the two lugs having facing profiled surfaces which extend generally radially of the annular braking disc member, part of a spoke engaging the profiled surface of one lug to be retained thereby whilst part of an intermediate member engages the profiled surface of the other lug to thus be retained thereby, spring means being located between said spoke and said intermediate member to press said spoke and said intermediate member against the respective profiled surfaces and to thus retain the spoke between the lugs whilst allowing for radial movement between the spokes and said annular braking disc member.

In a preferred embodiment of the present invention the hub member has four equi-spaced apart radially outwardly extending, coplanar spokes, the hub member being attachable to a wheel hub by bolts. Alternatively the hub member may be attachable to the wheel web which extends between the wheel hub and an outer rim of the wheel. Preferably the profiled surfaces of the lugs are concave and preferably V-shaped, and the engaging parts of the spoke and intermediate member are preferably complementarily shaped. Alternatively the profiled surface of the lugs may be convex and the engaging parts of the spoke and intermediate member may be convex and preferably complementarily shaped.

The spring means is preferably in the form of a resilient "roll pin" which engages in facing elongate grooves, which are curved in transverse cross-section and which are provided in the spoke and said intermediate member.

The provision of the intermediate member facilitates manufacture of the present invention as the hub member can be located coaxially with the annular disc member and moved axially thereof to locate the free end regions of the respective spokes between respective pairs of lugs on the annular disc member. Then the intermediate members and roll pins can be located in position to secure the hub member and annular braking disc member together. Alternatively the intermediate members may have previously been located in position against a lug, retaining pins being used to hold the intermediate members in position, and then with the hub member positioned with the spokes between said lugs, all that is required is for the roll pins to be slid radially of the assembly between the spokes and intermediate members. Preferably a retaining pin is used to secure the roll pin to the intermediate member to prevent the roll pin from being worked out due to a combination of centrifugal and thermally induced mechanical forces during use, i.e. during rotation of the braking disc when mounted on the wheel.

A braking disc constructed according to the present invention is mounted on each side of a wheel and, under braking, the braking discs are pressed against the web of the wheel which extends between the hub and outer rim of the wheel. Thus, under braking, the braking discs may flex especially if the discs do not engage the wheel web when the brakes are in a released condition. To provide for an integral braking disc assembly on a wheel, studs may be secured between aligned spokes of the two braking discs, the studs passing through apertures in the wheel web. Preferably one end region of a stud is threaded and screwed into a complementarily threaded bore in the rear of a spoke on one side of the wheel web, and the other end region of the stud comprises a necked-down region and a head, the head being engageable in an enlarged aperture in the rear of a spoke on the other side of the wheel web, relative circumferential movement of the braking disc and stud causing the stud to move into a reduced dimension part of said aperture whereby the stud is retained within said aperture. Thus, the stud provides a positive connection between braking discs on opposite sides of a wheel web at least reducing the flexing capability of the braking discs under braking. As an alternative to the stud being screwed into a spoke, the stud may be attached by any suitable means, e.g. welded.

The present invention will now be further described, by way of example, with reference to the accompanying drawings, in which:

FIG. 1 is a partial cross-sectional view of a wheel incorporating two braking discs constructed according to a preferred embodiment of the present invention;

FIG. 2 is an axial view of the wheel of FIG. 1;

FIG. 3 is a rear axial view of one of the braking discs used in FIGS. 1 and 2;

FIG. 4 is a view along line 'X' in FIG. 3 of part of the braking disc;

Figure 5:
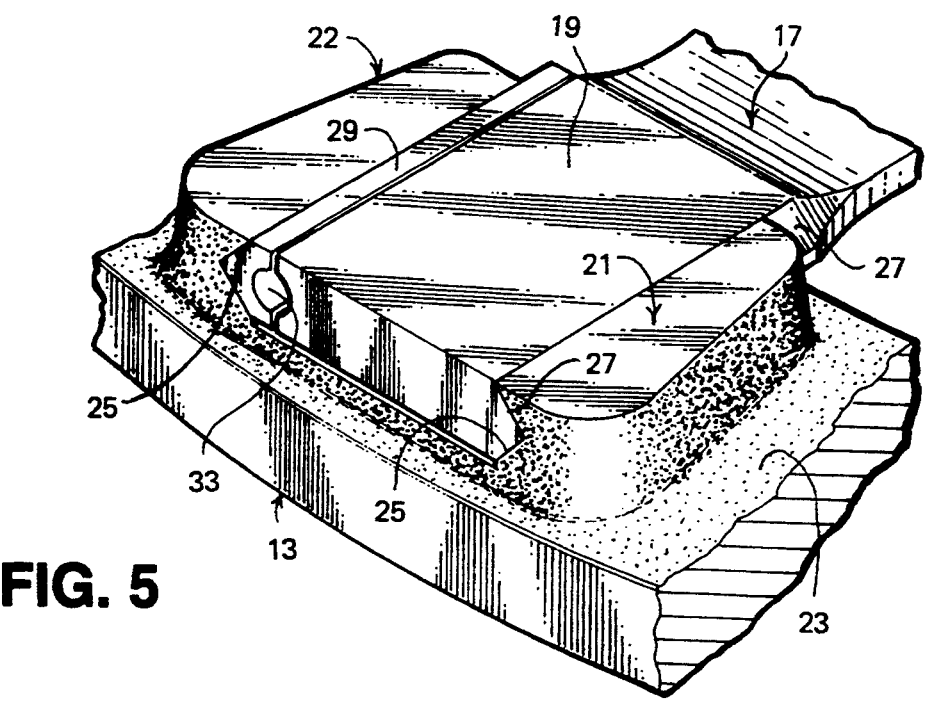
FIG. 5 is a perspective view of part of the rear of the braking disc of FIGS. 3 and 4.

The wheel generally designated 1 in FIGS. 1 and 2 of the accompanying drawings comprises a central hub 3 and an outer annular rim 5 interconnected by a web 7. A braking disc 9 constructed according to the present invention is bolted to the central hub 3 on each side of the wheel 1.

Each braking disc 9 comprises a hub member 11 and an annular disc member 13. The hub member 11 has a central annulus 15 from which four equi-spaced apart spokes 17 generally radially extend. Any number of equi-spaced apart spokes can alternatively be provided. Also, the spokes need not be equi-spaced apart from each other. The hub member 11 is located coaxially with respect to the annular disc member 13, with the free end region 19 of each spoke 17 being located between a pair of lugs 21,22 which project from the rear face 23 of the annular disc member 13, the other face 24 of the annular disc member 13 forming the braking area of the disc 9. The lugs 21,22 of each pair of lugs have profiled facing faces 25 which are concave and V-shaped. Alternatively the profiled facing faces can have a different concave configuration, or they can be convex and of a desired convex configuration. An edge 27 of each spoke 17 is profiled to be a complementary fit in a V-shaped face 25 of a lug 21, and to hold the spoke in this position an intermediate member 29 engages in the V-shaped face 25 of the other lug 22, with spring means in the form of a roll pin 31 being located between the intermediate member 29 and the spoke 17.

Surfaces 30 of the intermediate member 29 present a V-shape which is a complementary fit in the profiled face 25 of said other lug 22, and also the intermediate member 29 and spoke 17, have facing elongate grooves 33 which are arcuate in transverse cross section, and in which the roll pin 31 engages. If desired the elongate grooves 33 can have an alternative suitable profile.

During assembly of the braking disc 9, the hub member 11 is located coaxially with the annular disc member 13, and moved axially thereof to engage the spokes 17 between pairs of lugs 21 and 22. Next, the intermediate members 29 are located against a profiled face 25 so that with the spokes between the lugs, the roll pins 31 can merely be located between the respective spokes 17 and intermediate members 29 to secure the hub member 11 to the annular disc member 13.

Figure 6:
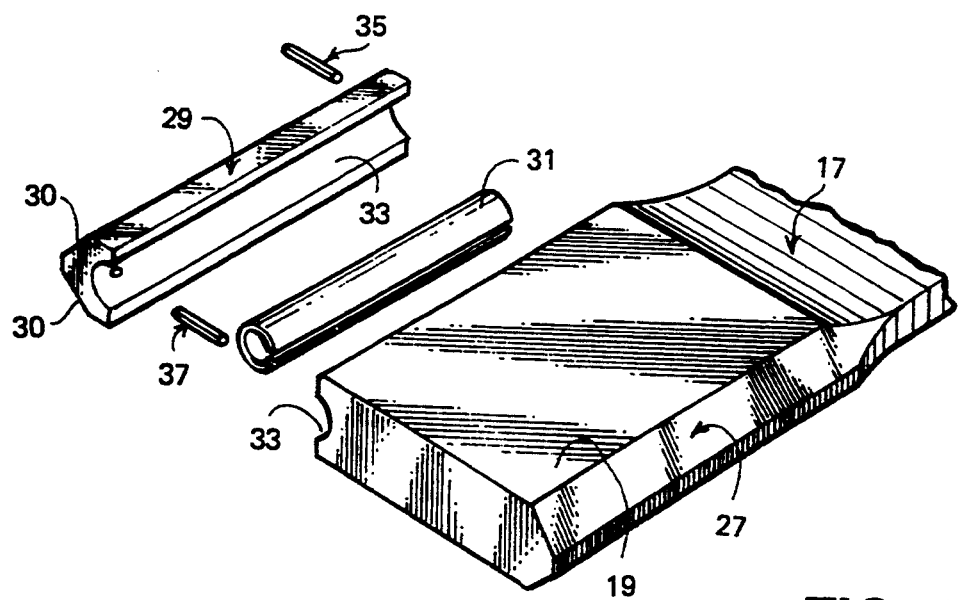
FIG. 6 is an exploded view of part of FIG. 5.

As shown in FIG. 6, a retaining pin 35 engages in a bore (not shown) in the intermediate member 29 radially inwardly of said other lug 21, to hold the intermediate member against centrifugal forces and mechanical forces during use, the pin 35 engaging lug 22 if the intermediate member 29 should move radially outwardly of the wheel. Also a retaining pin 37 engages in a bore in the intermediate member 29 to likewise hold the roll pin 31 against centrifugal and mechanical forces during use.

Whilst the profiled faces 25 in the illustrated preferred embodiment of the present invention are V-shaped, different profiled faces can be selected for each lug of each pair of lugs, the sole pre-requisite being that the spokes 17 and intermediate members 29 are shaped to interengage therewith.

To mount the braking disc 9 on the wheel 1, the central annulus 15 of the braking disc is secured by bolts 39 to the central hub 3 of the wheel 1. In this position the spokes 17 lie against or near to the wheel web 7, the said other face 24 of the annular disc member 13 forming an unbroken braking area.

Figure 7:
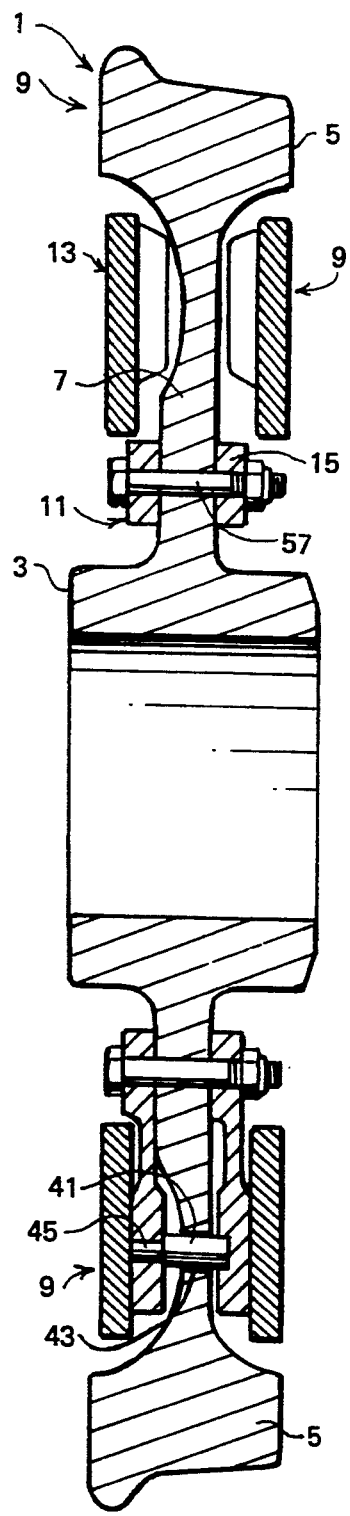
FIG. 7 is a cross-sectional view of a wheel incorporating two braking discs constructed according to a further embodiment of the present invention.
Figure 8:
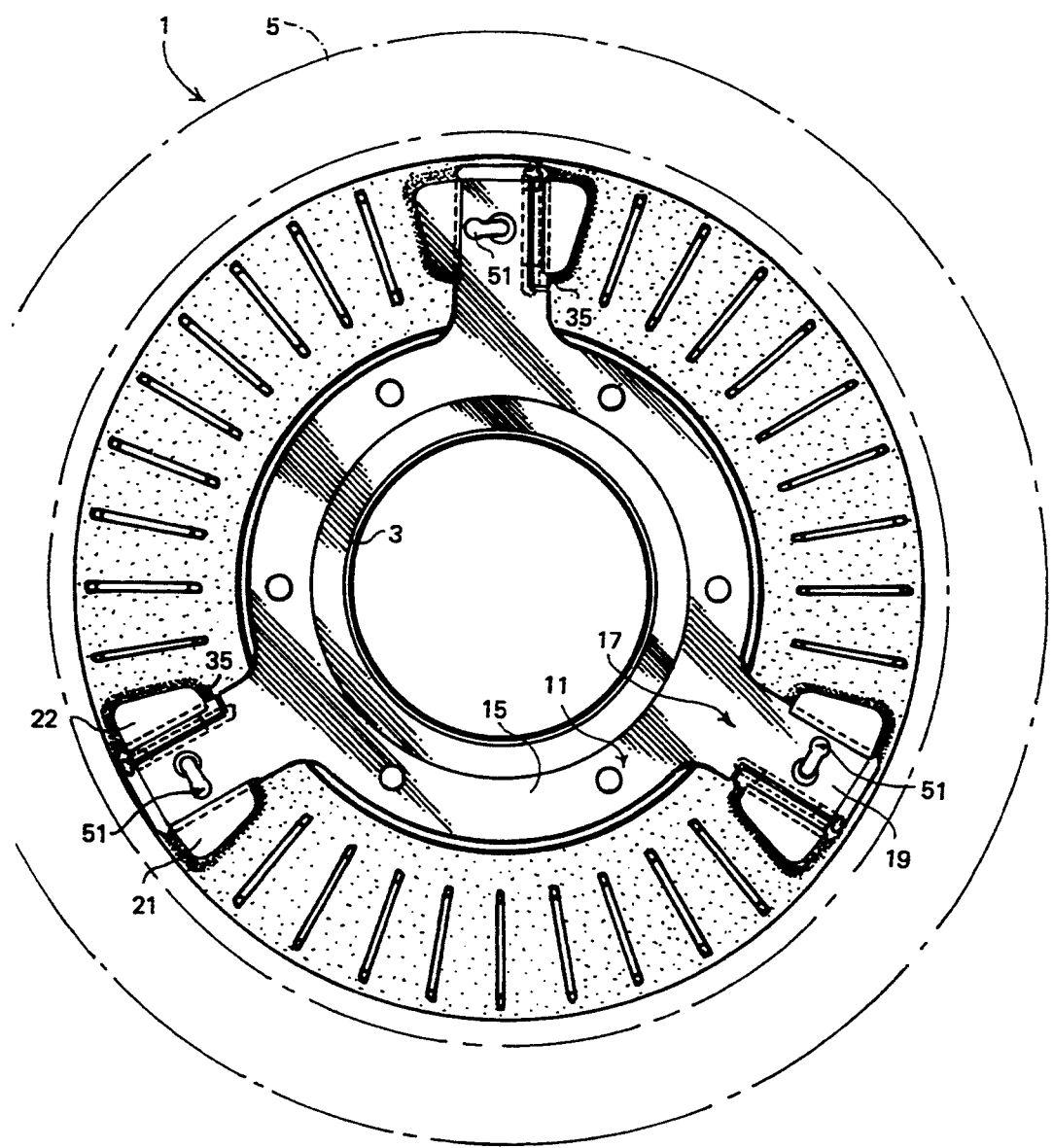
FIG. 8 is an axial view of the wheel of FIG. 7.

FIGS. 7 and 8 of the accompanying drawings illustrate a basic wheel the same as previously described with reference to FIGS. 1 and 2, the sole difference lying in the alternative embodiment of braking disc 9 which is constructed according to the present invention. The same reference numerals are therefore used in the construction of FIGS. 7 and 8 as have been used in the previous figures of drawings to identify like parts.

It is to be noted from FIG. 7 of the accompanying drawings that the central annulus 15 of the hub member 11 of each braking disc 9 is bolted to the wheel web 7 with the radially outwardly projecting spokes 17 lying near to the surface of the web. The annular disc member 13 of each braking disc is attached to the spokes 17 as shown in FIGS. 5 and 6. However, to at least reduce the likelihood of the braking discs flexing under braking, the pairs of aligned spokes 17 of the braking discs 9 mounted in opposite sides of the wheel web 7, are each connected together by a stud 41 which passes through an aperture 43 in the wheel web 7.

Figure 10:
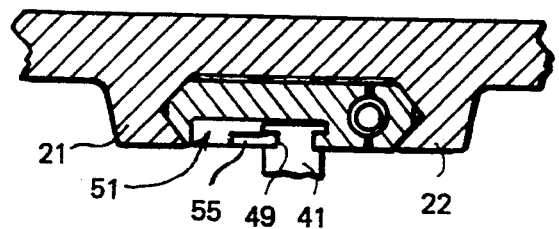
FIG. 10 is a cross sectional view through a spoke of a braking disc used in the embodiment of FIGS. 7 and 8.
Figure 9:
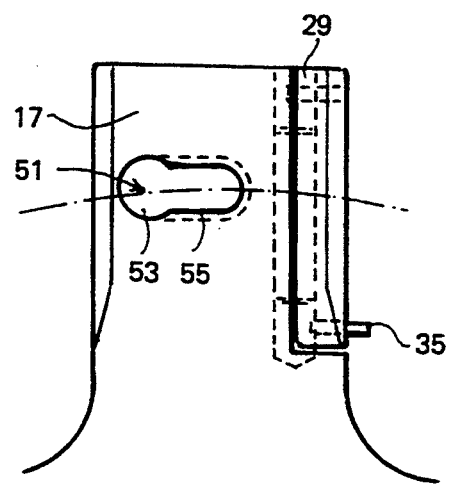
FIG. 9 is an enlarged rear view of part of a braking disc used in the embodiment of FIGS. 7 and 8.

Each stud 41 is generally cylindrical with one end region 45 being threaded so that it can be screwed into a complementarily threaded bore in the rear face of a spoke in one braking disc during assembly. The said one braking disc is thus located on the wheel with the studs passing through the apertures 43 on the wheel web 7. The other end region of each stud 41 has a head 47 and an adjacent necked down region 49 (see FIGS. 7 and 10), and the rear face of each spoke 17 of the other braking disc has an aperture or circumferential slot 51, one end region 53 of which is large enough to receive a head 47. The entrance to the remaining part of the slot 51 is reduced to provide a lip 55. Thus, the other braking disc can be located on the other side of the wheel with the heads 47 of the respective studs 41 engaging in the said one end region of the slots 51 of the respective spokes 17. Then by rotating said other braking disc relative to the wheel the studs move across said slots 51 so that the lips 55 engage in the respective necked-down regions 49 with the heads 47 retained axially behind the said lips 55. The central annulus 15 of said other braking disc can then be secured to the web 7 by bolts 57, securing holes in the web 7 and the respective hub members 11 being aligned. The studs 41 thus positively interconnect the spokes 17 and hold the braking discs apart under braking, thus minimising flexing of the braking discs.

The braking disc 9 of the present invention thus provides a maximised braking area, there being no need for any apertures thereon, and also thermal expansion is catered for by virtue of the fact that the annular disc member 13 can slide radially on the spokes 17.

I claim:

1. A braking disc comprising a hub member and an annular braking disc member, the hub member being attachable to a wheel and having at least two outwardly extending spokes, a free end region of each spoke being engageable between two lugs provided on a face of the annular braking disc member, the opposite face of the annular braking disc member forming the braking area of the disc, the two lugs having facing profiled surfaces which extend generally radially of the annular braking disc member, part of a spoke engaging the profiled surface of one lug to be retained thereby whilst part of an intermediate member engages the profiled surface of the other lug to thus be retained thereby, spring means being located between said spoke and said intermediate member to press said spoke and said intermediate member against the respective profiled surfaces and to thus retain the spoke between the lugs whilst allowing for radial movement between the spokes and said annular braking disc member.

2. A braking disc according to claim 1, wherein the spring means are in the form of a resilient roll pin which engages in facing elongate grooves which are provided in the spoke and said intermediate member respectively.

3. A braking disc according to claim 2, wherein the elongate grooves are curved in transverse cross-section.

4. A braking disc according to claim 2, wherein a retaining pin is used to secure the roll pin to the intermediate member.

5. A braking disc according to claim 1, wherein the profiled surfaces of the lugs are concave.

6. A braking disc according to claim 5, wherein the part of the spoke and intermediate member which engage said one lug are complimentarily shaped to said profiled surfaces.

7. A braking disc according to claim 1, wherein the profiled surfaces of the lugs are V-shaped.

8. A braking disc according to claim 7, wherein the parts of the spoke and intermediate member which engage said lugs are complimentarily shaped to said profiled surfaces.

9. A braking disc according to claim 1, wherein the hub member has four equi-spaced apart, radially outwardly extending, coplanar spokes.

10. A braking disc according to claim 1, wherein the hub member is attached to a wheel hub by bolts.

11. A braking disc according to claim 1, wherein the hub member is attached to a wheel web which extends between a hub and an outer rim of said wheel.

12. A braking disc according to claim 1, wherein a retaining pin is used to hold the intermediate member in position against said other lug.

13. First and second braking discs each comprising a hub member and an annular braking disc member, said hub members being attachable to opposite sides of a wheel and each having at least two outwardly extending spokes, a free end region of each spoke being engageable between two lugs provided on a face of the annular braking disc member, the opposite face of the annular braking disc member forming the braking area of the disc, the two lugs having facing profiled surfaces which extend generally radially of the annular braking disc member, part of a spoke engaging the profiled surface of one lug to be retained thereby whilst part of an intermediate member engages the profiled surface of the other lug to thus be retained thereby, spring means being located between said spoke and said intermediate member to press said spoke and said intermediate member against the respective profiled surfaces and to thus retain the spoke between the lugs whilst allowing for radial movement between the spokes and said annular braking disc member, said spokes of said hub members being aligned with each other, studs secured between aligned spokes of said first and second braking discs, said studs passing through apertures in said wheel web.

14. A wheel according to claim 16, wherein one end of each stud is secured to the rear of a spoke on one side of the wheel web, and the other end of the stud comprises a necked-down region and a head, the head being engageable in an enlarged aperture in the rear of a spoke on the other side of the wheel web, relative circumferential movement of the braking disc and stud causing the head of the stud to move into a reduced dimension part of the aperture which engages in said necked-down region of the stud, whereby the stud is retained in said aperture.

15. A wheel according to claim 14, wherein said one end of each stud is threaded and screwed into a complimentarily threaded bore in the rear of a spoke on one side of the wheel web.

* * * * *